Feb. 1, 1966    G. R. MILLER ETAL    3,232,306
SELECTOR VALVE AND AIR SUPPLY SYSTEM FOR COMBINED
AIR SPRING AND SHOCK ABSORBER UNITS
Filed May 20, 1964    3 Sheets-Sheet 1
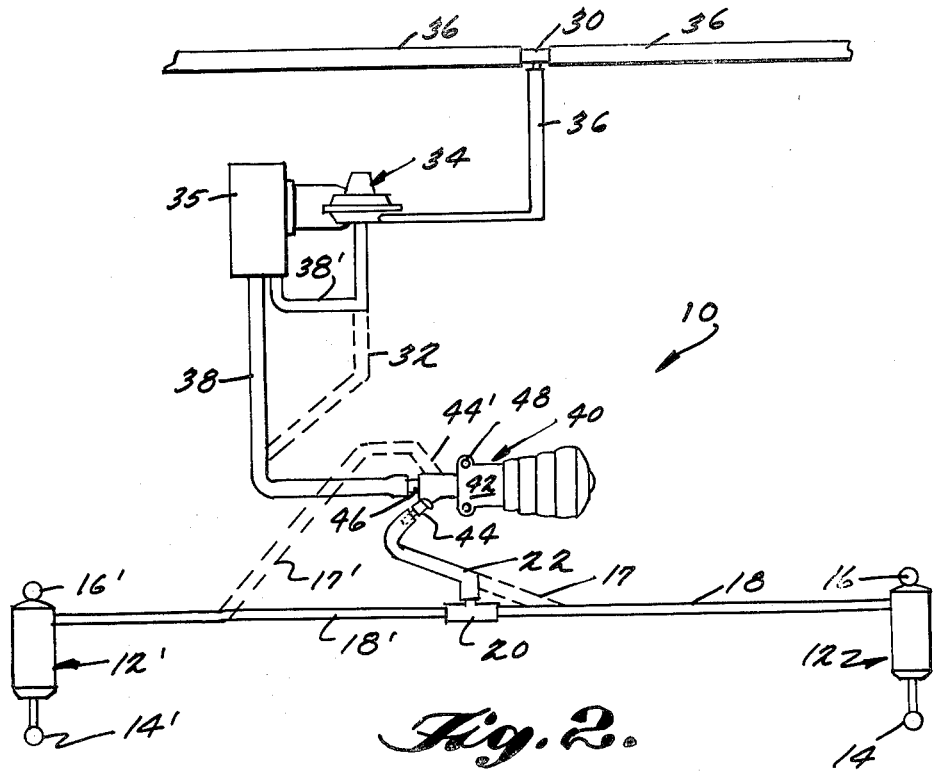
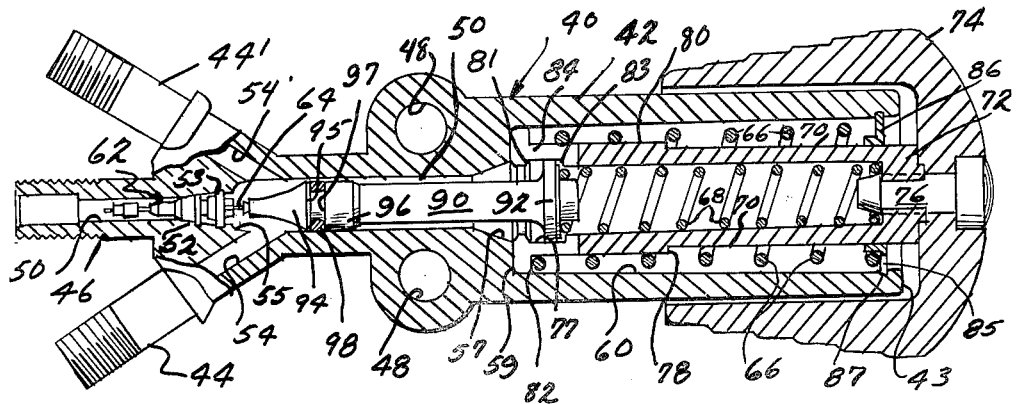
INVENTORS
GERALD ROGER MILLER
SELLERS B. McNALLY
BY
Cushman, Darby & Cushman
ATTORNEYS

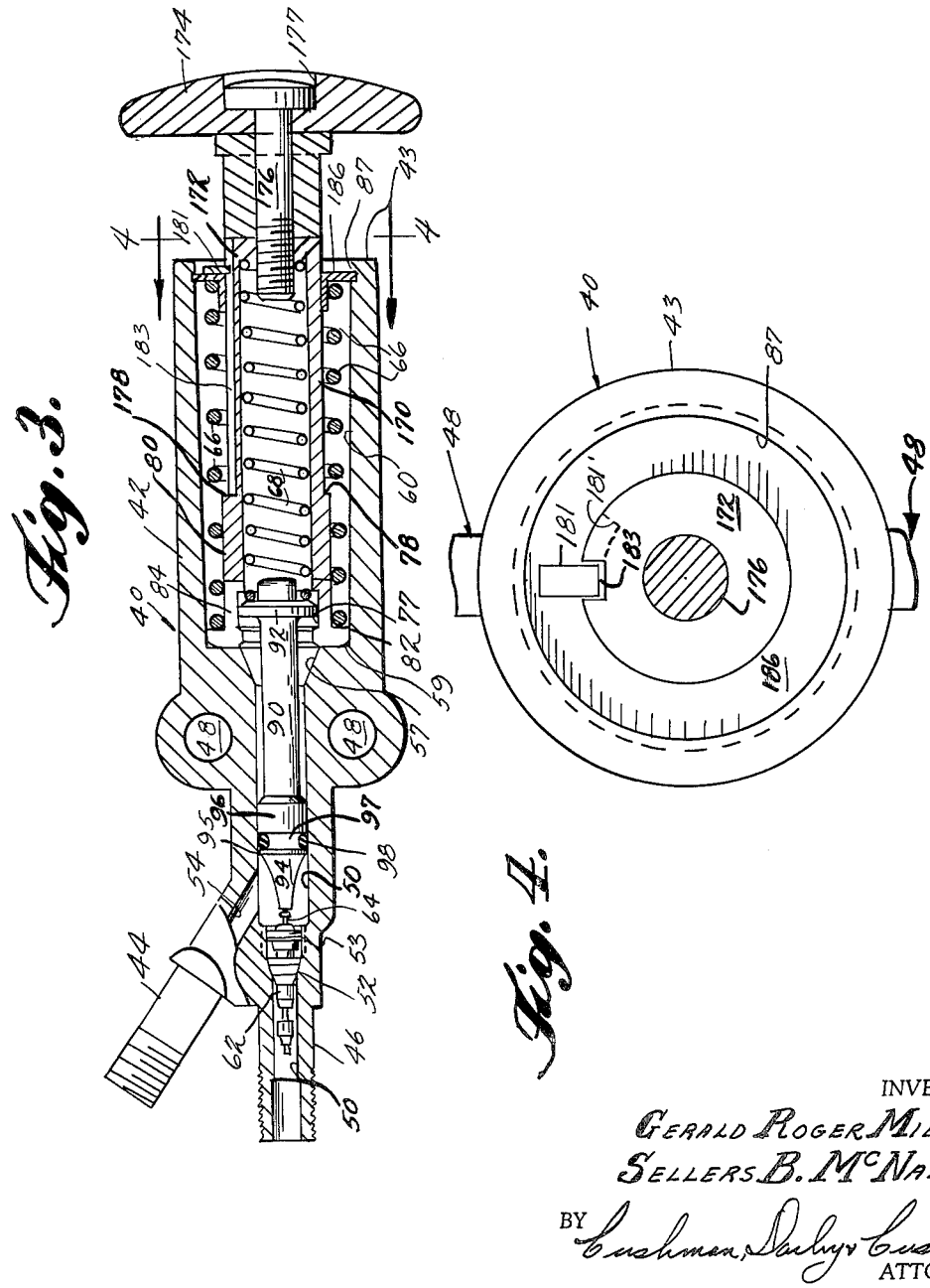

INVENTORS
GERALD ROGER MILLER
SELLERS B. McNALLY
BY Cushman, Darby & Cushman
ATTORNEYS United States Patent Office 3,232,306
Patented Feb. 1, 1966

3,232,306
SELECTOR VALVE AND AIR SUPPLY SYSTEM FOR COMBINED AIR SPRING AND SHOCK ABSORBER UNITS
Gerald Roger Miller, Northfield, and Sellers B. McNally, Chesterland, Ohio, assignors to Maremont Corporation, Chicago, Ill., a corporation of Illinois
Filed May 20, 1964, Ser. No. 368,848
13 Claims. (Cl. 137—116.5)

The present invention relates to fluid control valves and more particularly to improved fluid control and selector valves for fluid supply systems of load supporting shock absorbers. A suitable fluid supply system for use with the valves of the present invention is disclosed and described in copending application, Serial No. 322,347, filed November 8, 1963, now Patent No. 3,193,310. Suitable load supporting shock absorbers for use with such fluid supply system and the valves of the present invention are thoe disclosed and described in copending application, Serial No. 190,106, filed April 25, 1962, now Patent No. 3,173,671.

The absorber units to which the valve of the invention is particularly adaptable are those units which are mounted between the sprung and unsprung masses of a vehicle to provide a load supporting assist to the normal springs between such masses and also to provide the necessary damping action or energy absorption during the relative movement between the masses. In this type of unit, the load supporting portion generally includes at least one variable volume fluid chamber generally filled with a gaseous fluid such as air, and the height of the sprung mass of the vehicle with respect to the unsprung mass thereof is controlled by introducing and exhausting air under pressure into and from the fluid chamber of each unit. Various valves and systems have been proposed for automatically and/or manually controlling the air supply for these units. One such valve is shown in copending application, Serial No. 190,106, filed April 25, 1962, which provides for manual operation within a predetermined pressure range, while automatic operation is provided at the upper and lower limits of such range to protect the air supply system and the vehicle and prevent over or under loading.

However, the known devices, including those of the above copending application, are not entirely satisfactory and the art is still desirous of a more automatic control which combines automatic control adjacent the upper and lower pressure limits of the absorber units with automatic and manual control in the range intermediate the high and lower pressure extremes. It is also desired to provide a vehicle user with the ability to raise and lower the sprung mass of the vehicle while preventing, as much as possible, damaging of the shock absorber system and permitting too much fluid being added to the units or removed therefrom.

It is therefore an object of the present invention to provide an improved valve and fluid supply system for combined manual and automatic control of fluid supply to the variable volume fluid chambers of load supporting shock absorber units.

Another object of the present invention is to provide a valve of the type described for convenient mounting in a vehicle to permit the control of the fluid supply to a pair of interconnected shock absorber units.

Still another object of the present invention is to provide a valve of the type described wherein a gaseous fluid can be manually and automatically admitted to and removed from shock absorber units over a wide range of pressures to maintain the fluid pressure in the absorber units within a desired pressure range.

A further object of the present invention is to provide a valve of the type described which is reliable, inexpensive and relatively easy to install as accessory equipment on existing vehicles.

Other and further objects and advantages of the present invention will become more apparent to those skilled in the art as reference is had to the following description and drawings.

Broadly stated, these and other objects are satisfied according to the invention by providing a selector valve which is adapted to be mounted on the dashboard of an automobile for controlling the flow of air or other fluid under pressure from an accumulator, or directly from a compressor, to the variable volume fluid chambers of a pair of interconnected load supporting shock absorber units. The present valve construction includes a main plunger having an operating column which is normally maintained in a null position wherein an internal valve serves to close off communication of the accumulator or compressor from the absorbers, and additionally includes an O-ring seal engaging the periphery of an internal area which serves to prevent communication of the absorber units with the atmosphere. A knob is secured to the outer end of the main plunger so that the operating column may be pushed inwardly to engage the internal valve and communicate the accumulator or compressor with the absorber units. Alternately, the knob can be pulled outwardly until the O-ring seal permits fluid under pressure in the absorber units to be passed through the valve body to the atmosphere. In addition, the present valve construction is arranged so that the plunger will move in response to the pressure within the absorber units to automatically admit or discharge fluid when the pressure within the system falls below or exceeds, respectively, a predetermined operating range. Another surprising improvement offered by the present invention is the ability to permit automatic operation within a selected and predetermined maximum operating range requiring precise control for heavy load conditions. This feature of the invention functions in a manner that prevents unskilled tampering in the maximum operating range where precision is required, but yet does not interfere with manual or automatic control in the normal operating range.

Turning now to the drawings:

FIGURE 1 is a schematic view of a load supporting shock absorber air filling system incorporating an improved valve embodying the principles of this invention;

FIGURE 2 is a longitudinal sectional view through the valve shown in FIGURE 1, some portions thereof being illustrated in elevation for clarity;

FIGURE 3 is a longitudinal sectional view of a second embodiment of the valve according to this invention that may be used in the system shown in FIGURE 1;

FIGURE 4 is a sectional view taken along lines 4—4 of FIGURE 3 to illustrate a constructional embodiment of the valve shown in FIGURE 3;

Figure 5:
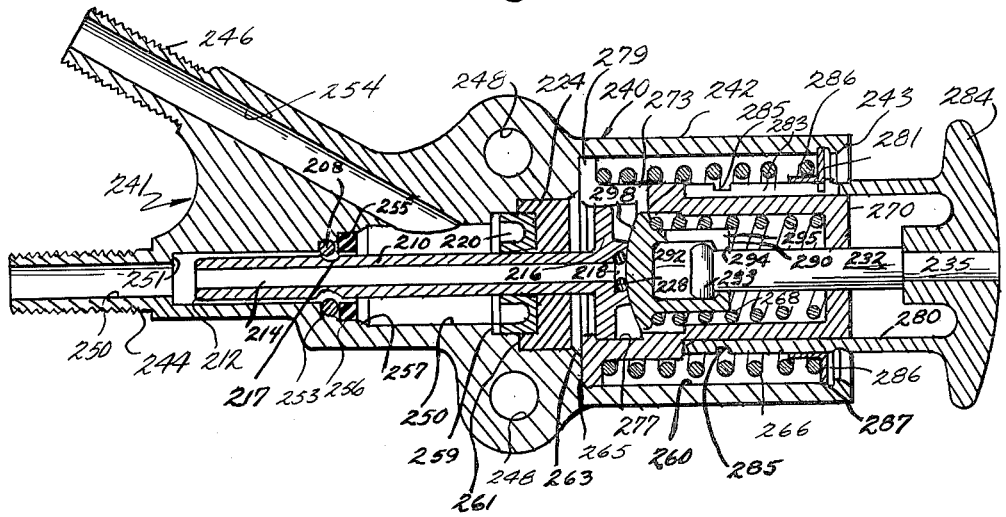
FIGURE 5 is a longitudinal sectional view of a third embodiment of the valve according to this invention that may be used in the system shown in FIGURE 1.

Referring to FIGURE 1, the load supporting shock absorber system illustrated generally at 10 is shown with a pair of shock absorber units 12 and 12', although only a single such unit, or two or more may be employed as desired. The absorber units are each connected at a first or lower end 14, 14' to the unsprung mass, i.e., the suspension member or axle of the vehicle (not shown), and are connected at a second or upper end 16, 16' to the sprung mass or vehicle body and chassis. Within each absorber body is a variable volume fluid chamber (not shown) to which a compressible fluid, such as air, can be admitted and removed to change the height of the body and chassis with respect to the wheel and axles, either to suit personal preference or to accommodate the vehicle to a change in load. As shown, in solid lines, the chamber portion of each absorber has a conduit 18, 18' connected thereto which extends to and interconnects at a T connection 20. A further conduit 22 then extends from the common leg of the T 20 to a port 44 of the novel selector valve indicated generally at 40, which is representative of all the valve embodiments of this invention. Alternatively, as shown in dotted lines, the valve 40 may have two ports 44, 44' which are each connected directly to the absorber units by means of conduits 17, 17'. In such case, T 20 and conduit 22 are eliminated. With either construction, all conduits are preferably flexible walled, though capable of withstanding moderate pressures in the order of 200 p.s.i. and may conveniently be formed of polyethylene, nylon, butyl rubber or the like.

The body portion 42 of the selector valve 40 is preferably mounted for convenient accessibility on a vehicle instrument panel (not shown) for example, with the aid of suitable bolt or other known fastening means receiving openings 48—48, preferably with only the knob portion protruding. Another port 46 of the selector valve 40 is connected as by a conduit 32 (shown in dotted lines) to a suitable compressor 34, which may be vacuum powered and operated from the same vacuum line as the vehicle windshield wipers, for example, by T 30 and conduits 36. Preferably, an accumulator tank 35 is interposed between the compressor 34 and valve 40 with conduits 38, 38' to provide for operation of the system 10 during periods when the compressor or vehicle engine is not operating.

Turning to FIGURE 2, valve body 42 of valve 40 is provided with a central passage or throughbore 50 opening outwardly through the port 46 and side passageways 54, 54' extending between the ports 44, 44' and the throughbore 50 intermediate the ends thereof. The valve body 42 is preferably formed as an integral unit from a plastic material such as polyoxymethylene (Delrin) by injection molding, although other methods and materials may be used. Instead of the three port construction shown, it is to be understood that one of the two side ports can be removed to provide a two port construction resembling that shown in FIGURE 3 below. The legs of the valve comprising ports 44, 44' and 46 may be threaded on their exterior and are provided with annular, radially extended surfaces in order to more securely and sealingly receive their respective conduits 17, 17' or 22 and 32 or 36. The throughbore 50 is conically tapered at 52 and threaded at 53 to receive a pneumatic tire-type valve 62 arranged so that its actuator 64 is directed inwardly of the port 46. The throughbore 50 is counterbored at 55 approximately adjacent the point where passageways 54, 54' intersect the throughbore 50, which is again counterbored at 57 and 59 to form a conical fluid release passage and a shoulder opening into a chamber 60, respectively. These last counterbores, directed outwardly toward the inner end of the column 70, have a net effect of enlarging the diameter of the throughbore 50 near its outer extent. Accordingly, the conical passage 57 could be notched, etc., to accomplish the same fluid release effect.

An operating column 70 is received in the chamber 60 having a first end 72 extending outwardly of the valve body outer end 43. Preferably, an indicator type control knob 74 is mounted on the column first end 72 by a set screw 76 threaded axially into the outer end of column 70. The operating column 70 is cylindrically enlarged at 78 adjacent the inner end of the column to form a cylindrically tapered spring guide thereon as at 80, and the column is cylindrically enlarged again at 82 to provide an annular seat. The column 70 is slidingly supported for axial movement in the chamber 60 by engagement of the periphery of annular seat 82 with the inner periphery of the chamber, while column 70 is slidingly supported near its outer end 72 by an annular disc 86 received in a circular detent 87 in the chamber 60 adjacent the outer end 43 of the valve body and the column slidingly engages the periphery of the inwardly flared central opening in the disc 86 through which the column extends. Axial slots are provided in column 70 at 84 to permit fluid passage and facilitate assembly of poppet plunger 90, as will be appreciated hereinafter. A plurality of narrow, axially directed slits may also be formed through the wall of the valve body 42 at its outer end 43 as to communicate the chamber 60 with the exterior of the valve and provide flexibility of the valve body adjacent its outer end so that the disc 86 can easily be snapped into place in the detent 87. As shown, the disc 86 may be slotted, as at 85, to permit an alternative fluid passage to the atmosphere.

Contained within the inner, cylindrically enlarged portion 80 of the column 70 is a poppet plunger 90 having an enlarged outer annular portion 92 which slidingly engages the internally enlarged counterbore 77 contained within the operating column 70. Poppet plunger 90 is provided at its inner end with a tapered elongated projection 94 which is formed for contacting the tire-type valve actuator 64. Poppet plunger 90 is also provided with annular shoulders 95, 96 which provide a detent 97 on the outer periphery of the poppet plunger for receiving an O-ring 98 which rides in the throughbore 50 with shoulders 95 and 96 to retain the poppet plunger in place. The O-ring 98 is in sealing engagement with the inner periphery of the throughbore 50.

As shown in FIGURE 2, a helical spring 66 is mounted within the chamber 60 surrounding the column 70 and having its outer end abutting the interior side of the annular disc 86 and its inner end about the tapered spring guide 80 and abutting the annular seat 82 on the column 70. Another spring 68 is provided interior of the column 70, such that the outer end of spring 68 abuts the inner side of the column end 72 while the inner end of spring 68 abuts the shoulder 92 of the poppet 90. The relative lengths and force constants of the springs 66, 68 are of particular importance and determine the automatic operation of the invention in conjunction with the structural features of the present valve assembly, as will be appreciated from the subsequent explanation of system operation. As will also be appreciated, the FIGURE 2 embodiment shown with the knob structure 74 permits accurate calibration and a direct indication to the user of the operation of the system with particular regard to pressure. Thus, if the external portions of the valve body 42 are suitably calibrated to show increments of pressure, the innermost end portion of the knob 74, a suitable indicator provided thereon, or an axial slit or clear window provided therein, will show the pressure in the system, at any given moment, by the automatic movement and positioning of the knob 74.

Turning now to FIGURES 3 and 4, the embodiment shown is similar in many respects to the embodiment of FIGURE 2 such that like reference numerals have been employed to denote identical parts and to indicate portions of the above description that apply equally well to the configuration shown in FIGURES 3 and 4. The FIGURE 3 embodiment differs from FIGURE 2 in the knob structure 174 and the structure of the operating column 170. It will be understood by those skilled in the art that the knob structure 74 of FIGURE 2 can be substituted for the knob structure of FIGURE 3 to generally provide the two port construction discussed above. Knob structure 174 is connected to the elongated end 172 of the modified operating column 170 by means of machine screw 176 provided in a recess 177.

Another difference from the FIGURE 2 embodiment is in the construction of the operating column 170, prepared from a plastic material such as "Delrin," and provided with a longitudinal slot 183 extending from the shoulder 178 to the outer end 172. As best shown in FIGURE 4, slot 183 is adapted to coact with the limiting key 181 attached to the annular disc 186, either by soldering, or by partially cutting into disc 186 to provide a tab that may be bent into position. Key 181 is adapted to coact with a bayonet slot 181' provided in the side wall (see FIGURE 4, dotted lines) of slot 183 near the outermost end thereof to provide a detent for holding the control knob and operating column fully depressed. A turning movement will lock the control knob in the bayonet slot until the control knob is turned from the locking position by the user. In areas of slot 183 not provided with the bayonet slot, the key 181 can prevent the rotational movement of operating column 170 and knob 174 with respect to the valve body. Slot 183 also provides for the release of pressurized fluid to the atmosphere when annular disc 186 and/or the outer valve body end are not slotted like the annular disc 86 and valve body end 43 in FIGURE 2. Further, the slot and key arrangement 183, 181 may be used to control the longitudinal travel of the operating column 170 and attached control knob 174 since (FIGURE 3) key 181 will coact with inner shoulder 178 when the control column is drawn to its outermost extent. In FIGURE 5, the third embodiment of the invention has modified overall configuration from that in FIGURES 2 and 3, but it will be seen that the external valve body parts of the FIGURE 5 embodiment are quite similar to those already described in connection with FIGURE 2, with the exception of the added structural web 241. Accordingly, parts similar to those shown in FIGURE 2 have been indicated as such by adding a two hundred (200) prefix to the FIGURE 2 reference numeral. The internal construction and operational features of the FIGURE 5 embodiment are different, however, and a first such difference is apparent from the valve port arrangement wherein the slanted port 246 does not lead to the units but leads instead to the accumulator tank. Straight port 244 then leads to the absorber units in the present embodiment. Another difference is apparent from the novel internal valve assembly shown by the flow regulator tube 210 which is mounted within the throughbore 250 adjacent a shoulder 251 near the innermost end of, and providing for the widening of, such throughbore. The throughbore 250 is again widened at 253 to provide a seat for the O-ring 208, which O-ring is secured by a retainer member 256 mounted within a recess 255. The throughbore is further widened by a chamfer at 257 and again by shoulders at 259 and 261. The shoulder at 259 provides a seat for a U-cup packing 220 which is secured by a U-cup retainer 224 formed of a synthetic plastic material, such as "Delrin" (polyoxymethylene) and mounted in the space provided by the shoulder 261. The throughbore 250 is widened again by a chamfer at 263 and by a shoulder at 265 to provide the enlarged chamber 260.

The flow regulator tube 210 is provided with a chamfered or annular tapered portion at 212 and has a central opening 214 extending therethrough. This tube may be fabricated from materials that permit precision manufacture, such as aluminum or annealed "Delrin." Two exterior key type detents 217 are provided for coaction with the O-ring seal 208. This O-ring, like other O-rings shown in the present invention may be commercially obtained and is normally formed from a synthetic rubber material such as Buna-N having a durometer hardness of about 70. As shown in FIGURE 5, when the detent 217 is moved to the "fill position," substantially in registration with the O-ring 208, fluid under pressure from the accumulator tank supply port 246 may easily pass therebetween and out through the absorber supply port 244. When the detents 217 on tube assembly 210 are moved to the right into the null position, however, passage of fluid under pressure will be prevented by sealing action between the O-ring and the exterior surface of the tube 210, and the absorbers will be effectively sealed from the fluid supply port 246. As also shown in FIGURE 5, the U-cup packing 220 provides a positive seal, coacting with the exterior surface of the tube assembly 210 and preventing fluid under pressure in ports 244, 246 and throughbore 250 from escaping past such seal and out to chamber 260 and the atmosphere. The U-cup may be commercially obtained and is normally formed of a synthetic rubber material such as a homogeneous Buna-N of about 70 durometer hardness, and may be externally lubricated when desired. The flow regulator tube 210 is also provided at its outer end with an enlarged shoulder portion 216 and a recess at 218 for receiving an O-ring seal 228, which O-ring seals ports 244, 246 and throughbore 250 from the atmosphere, via central opening 214, as will be explained below. Desirably, O-ring 228 is secured within the recess 218 by means of a suitable adhesive composition, although a physical device, such as an enlarged counterbore, can also be employed to accomplish this same end.

The embodiment of FIGURE 5 differs from that of FIGURE 2 also in the construction of the control knob 280 and the operating column 270. As shown, the control knob 280 provided with integral hand grip portion 284, is of enlarged size and is provided with a central opening for fitting movably, both longitudinally and rotationally, about the exterior surface of the operating column 270 and the interior air fill valve assembly. The control knob 280 is provided with a slot at 283 which coacts in a fashion similar to slot 183 of FIGURE 3 with a key, in this case key 281. In both FIGURES 3 and 5, the keys 181, 281 are attached to the annular discs 186, 286. Like FIGURE 3, the annular disc may be slotted in the embodiment of FIGURE 5 to permit the passage of pressurized fluid to the atmosphere. Also like FIGURE 3, a bayonet type locking slot, preferably is provided at the outermost end of slot 283 to coact with key 281 and securely lock the control knob when fully depressed, by means of a slight turning movement. Desirably, a plurality of grooves 285 may be provided in control column 281 adjacent slot 283 to provide an indication of pressure in the system.

The operating column 270 is generally cylindrically shaped, having portions abutting with and fitting within control knob 280 as shown, and column 270 is provided with slits, as at 273, to permit flexibility for assembly with the enlarged tube portion 216, and to permit release of pressurized fluid, when desired, from within tube 210, as will be subsequently explained. The operating column has mounted therein a generally cup-shaped poppet member 290 provided with an enlarged central opening 292 and a narrow annular opening 294 for coacting with the poppet guide pin 232 and integral retainer knob 233 on the end thereof. The poppet guide pin may be secured to the control knob 280 by solvent welding the member 235 within knob portion 284 since the poppet 290, like the poppet guide pin, may be prepared from a plastic material. In the case of "Delrin," the poppet guide pin is desirably secured within the control knob by an interference fit, or by means of spin welding. As shown, the poppet member is also slotted as at 295 to permit ease of mounting over the enlarged retainer knob 233. The exterior surface 298, when in the closed position, coacts as shown with the O-ring 228 to prevent the flow of pressurized fluid through the opening 214 and past the surface 298, thereby effectively sealing the pressurized fluid into the absorbers, and preventing the escape to the atmosphere. When O-ring 228 and surface 298 are not in touching contact, however, pressurized fluid from the absorbers will then be permitted to flow past surface 298, then through the slotted portion 273 in the operating column and out to the atmosphere, through slots provided in members 243 and/or 286. Alternatively, small holes may be provided in the valve body 240, or through the disc 286 to provide for this "bleed off" feature.

Operating column 270 is also provided with an interior enlarged counterbore 277 for receiving and controlling the movement of the enlarged shoulder 216 of the tube 210 with respect to the poppet member 290, and an internal poppet spring 268 is provided to control the movement of the poppet 290 toward and away from the tube assembly 210 within the confines of operating column 270 as will be explained below. Spring 268, at its inner end, fits about the exterior surface of poppet 290 and abuts against the enlarged annular portion of surface 298, while the outer end of spring 268 abuts against an interior portion of operating column 270. The calibration of spring 268 and cooperation thereof with elements 232, 290 and 216 normally connects knob 230 and column 270 for movement together. The movement of this entire assembly, including spring 268, is then regulated by the biasing spring 266, the inner end of which fits about the enlarged portion of the operating column, abutting against the innermost annular enlargement 279, while the outer end of spring 266 abuts against the interior surface of annular disc 286 and rests on the inwardly flared portion thereof.

Figure 6:
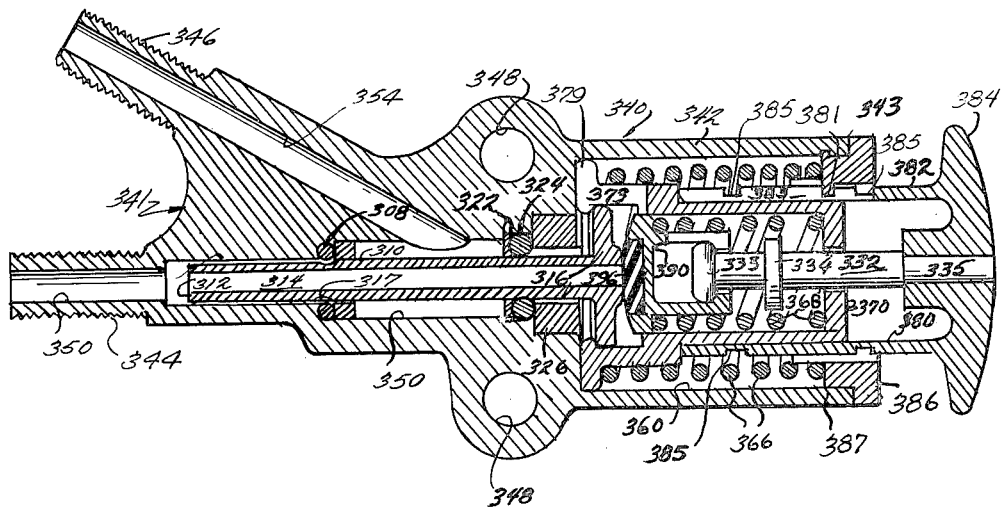
FIGURE 6 is a longitudinal sectional view of a fourth embodiment of the valve according to this invention that may be used in the system shown in FIGURE 1.

Turning now to FIGURE 6, it is readily seen that elements in the embodiment shown, which are similar to elements in FIGURES 2, 3 and 5, are numbered in a corresponding manner as explained above regarding the embodiment of FIGURE 5, but with a three hundred (300) prefix. Also, the FIGURE 6 embodiment is quite similar to that for FIGURE 5 above, with a few internal constructional differences. For example, in the FIGURE 6 embodiment, the U-cup and retainer 220, 224 are replaced by a ring retainer 322, which may be formed from plastic, as "Delrin," an O-ring 324 and a generally cylindrical O-ring retainer 326, all of which combine to seal high pressure fluid in port 346 from passing by the exterior surface of tube 310 and out into chamber 360 and the atmosphere. The tube 310 is provided with the internal opening 314 and detent 317, but the enlarged shoulder portion 316 contains no recess or O-ring seal. Instead, sealing in the present embodiment is provided by the resilient seal 396, preferably formed from a rubber material, that is mounted in a suitable recess in the poppet 390. When tube 310 is in a position abutting the surface of seal 396, the absorber units will be effectively sealed from the atmosphere since pressurized fluid in the absorber units will not be permitted to pass from the port 344, into and through the tube opening 314.

Turning to the construction of the control knob 380 and operating column 370, it is seen that the poppet guide pin 332 is provided with an annular enlargement or shoulder 334 for limiting the travel of the poppet 390 and the control knob 384 with respect to the operating column 370 for manual exhaust actuation. For knob 384, shoulder 334 will resist excessive force that may be applied to the knob by a user manually handling the same. Another difference from the embodiment of FIGURE 5 is in the construction of the annular disc which, in this embodiment takes the form of retainer ring 386, the same being a large annular member that is molded integrally with the key member 381 and is provided with inner flaring portions providing guide or seat portions for knob 380 and spring 366. As with previous constructions, retainer ring 386, or valve body end 343 can be provided with slotted openings to facilitate venting to the atmosphere. As shown, retainer ring 386 is attached within the outer end 343 by means of the circular extension which fits into detent 386. The key member 381 fits into the slot 383 which may be provided with a bayonet slot at its outermost end as in the preceding figures. Like FIGURE 5, a plurality of grooves 385 or other calibration may be employed on the knob surface 382 to provide a visual indication of system pressure. It has been found that this pressure calibration is linear and in direct proportion to the system pressure.

*Operation*

In operation of the embodiments shown in FIGURES 2 and 3, the port 46 of the valve is connected to a fluid pressure source as shown in FIGURE 1. Preferably the fluid pressure medium is air at up to 160 p.s.i. coming directly from the compressor 34, or the accumulator tank 35 supplied by the compressor, although with heavier vehicles, higher pressures are envisioned. Generally, the absorber units 12, or air springs as they are sometimes called, are designed to operate within a range of pressures. The lower limit of the range is generally dictated by the nearness of the sprung mass or vehicle body and chassis to the unsprung mass or axle at lower pressures. Care must be taken to avoid pressures that are so low as to permit excessive "bottoming" of the absorber units when the associated vehicle traverses a bump or receives a similar shock, since this could cause damage to the vehicle or the absorber units. The upper limit of the range is generally dictated by the pressure containing ability of the several components of the load supporting shock absorber system and should not be so great as to rupture any portions thereof. A preferred range for operation of the air springs as shown has been between about 10 and about 90 p.s.i., although it must be appreciated that the range is exemplary and could be extended or diminished in other systems employing the principles of this invention. The valve embodiments shown by the present invention, due to their novel constructional features have been found to permit higher pressures due to constructional improvements, and with properly calibrated springs, the valves shown herein can operate with precision at adsorber pressures up to 135 or 150 p.s.i. and even higher.

The automatic operation of the valves shown in FIGURES 2 and 3 is regulated by the coaction of the spring system 66, 68, spring 66 being calibrated to control minimum inflation or minimum fill, blow-off and pressure indication from 0 p.s.i. to blow-off p.s.i. and spring 68 being calibrated to control maximum inflation pressure. The pressure controlled by this embodiment of the invention is not entirely independent of accumulator tank pressure, the effective area of the valve core 62 times the pressure of the accumulator tank creating force which acts along with the pressure in throughbore chamber 50 to push the plunger 90 to the right. The relative length and force constants of the spring 66 and 68 cooperate such that the operating column 70 will remain in a null position whenever the pressure in the absorber units 12 is between the designed control limits. The null position actually represents a range of location for the poppet plunger and the operating column, between a position where element 94 opens the internal valve, and a position where the O-ring 98 reaches the tapered portion 57. In the null position, the combined spring forces urging the operating column and poppet plunger 90 toward actuation of the tire-type valve 62 are balanced by the pressure of the fluid within the absorber units 12, conduits 18, 22, etc., ports 44, 44′ and throughbore chamber 50 acting on the surface of part 94 and the O-ring 98. Since spring 68 has a greater rate and installed preload than spring 66, minimum pressure is maintained by spring 66 pushing column 70 to the left, therefore moving spring 68 and poppet plunger 90 to the left, contacting and opening tire valve 62 and allowing fluid to enter chamber 50 from the accumulator table supply. When the pressure in chamber 50 reaches minimum designed pressure, the pressure times area force on poppet plunger 90 pushes the plunger to the right, the force being transmitted through spring 68 and column 70 to spring 66 compressing it until tire valve closes. To limit maximum inflation pressure of the absorber units, the pressure in chamber 50 pushes the plunger 90 to the right, compressing spring 68 and moving out of contact with the stem 64, even though the column 70 is held in the far left position by the operator. Thus, for this function there is relative motion between column 70 and plunger 90. To limit maximum pressure in the absorber units, the pressure of chamber 50 again acts upon plunger 90 to the right, but at some pressure slightly above the maximum inflation pressure, the plunger 90 contacts the back shoulder 83 of the cavity 77 in the column 70 and the two pieces move as one to the right. At some maximum allowable pressure, approximately 200 p.s.i., the motion will be sufficient to permit the O-ring seal to break contact with the throughbore 50 and thus exhaust air from the absorbers. This "blow-off" is assisted by the tapered portion 57 which effectively reduces the diameter of the poppet plunger with respect to the throughbore diameter 50 at its inner end, so that the excess pressurized fluid flows between the tapered portion of the O-ring, into the chamber 60 and out through the slits 84, etc. Blow-off continues until the pressure in the absorbers has dropped back to within the designed operating range. In this manner, the present invention also provides automatic control between maximum inflation pressure and maximum allowable pressure. If the column is held to the left by the operator or by the key 181 and bayonet slot 181' (FIGURE 3) lock-in, this maximum pressure function cannot operate.

Pressure indication is a function which extends through the entire range of operation of the present valves from minimum pressure to blow-off pressure if the operating column 70 is not locked in place by the key 181 or restricted by the operator. The range of the null position, together with the higher and lower pressure limits, can therefore be calibrated on the valve body 42, as previously indicated so that the knob position 74 may provide a visual indication of the operating system pressure. Within the predetermined operating range, the vehicle user can adjust the amount of fluid pressure within the absorbers from the indicated pressure by simply manipulating the knob 74. It must be remembered, however, that this embodiment of the invention will admit or exhaust air within maximum and minimum limits of pressure only when the valve is moved to the inward or outward extreme only. Changing the position of the valve control knob in the intermediate ranges does not cause any flow to be incurred. Thus, should he desired to raise the vehicle body and chassis with respect to the axle, the user simply urges the knob 74, operating column 70, spring 68 and plunger 90, as a unit to the innermost extent so that the projection 94 on the poppet plunger 90 will depress the actuator 64 of valve 62, thereby allowing pressurized fluid from the higher pressure source 34 or 35 to flow through the port 46 and valve 62 to the throughbore chamber 50 and then through the ports 44, 44' and conduits 22, 18, etc., into the absorber units. As shown in FIGURE 2, spring 68 and the poppet plunger 90 are actually in a position that opens the internal valve 62 to provide for such fluid passage. Upon releasing the knob 74, the fluid pressure in the system portions last mentioned will impinge on the part 94 pushing the poppet plunger 90 and the operating column 70 outwardly, and the plunger when released, will return to its null position. It will be understood that the designed operating pressure limit cannot be exceeded by the user, if he or the "lock-in" does not restrict movement as noted above, since the excess pressure will cause the valve to operate automatically and perform the "blow-off" function.

If the vehicle user wishes to reduce the pressure and lower the vehicle body and chassis with respect to the axle, he simply pulls the operating column, together with poppet plunger outwardly until the tapered portion is again contiguous with the O-ring, and pressurized fluid within the system passes from the absorber units, through the chamber 60 and slits, etc., and out to the atmosphere. When the user releases the knob, the spring 66 moves the operating column and the poppet plunger inwardly and if the user has not removed too much fluid, the valve system will come to rest in the null position. If, however, he has removed so much fluid that the lower operating limit has been passed, the operating column and poppet plunger will continue to be moved inwardly until the extension 94 actuates the actuator 64, in the position shown, again admitting air from the high pressure source 34, 35, etc., to the absorber units 12. This operation continues until the fluid pressure in the absorber units again equals the lower operating pressure limit, at which point the valve system will return to the null position. Should the pressure in the absorbers exceed or fall below the planned operating range during the use of the vehicle, or while fluid at an exceedingly high pressure remains in the tank 35, the present novel selector valve will automatically actuate itself, via spring 66 and system pressure interaction as above explained, to recorrect the pressure in the absorbers.

The operation of the valve embodiments shown in FIGURES 5 and 6 is different in principle to the operation already described and it should be remembered that the adsorber units and high pressure supply ports 244, 344 and 246, 346, respectively, are in reversed order from the earlier embodiments, due to the functioning of the novel internal valves depicted and in this second embodiment, springs 266 and 366 provide automatic minimum fill pressure, for example about 10 p.s.i., and pressure indication control, while springs 268 and 368 provide maximum fill pressure control and blow-off pressure control.

Referring now to FIGURE 5 as an illustration for both FIGURES 5 and 6, to maintain minimum pressure, the spring 266 forces the column 270 to the left, and the poppet 298 and tube 210 move with column 270 as a rigid body since the preload of spring 268 is greater than the force applied by spring 266. When the tube 210 moves to the left, it allows air to flow from throughbore chamber 250 to the absorber units by detent 217 and filling continues until the fluid pressure is sufficiently great to cause deflection of spring 266. Then, the pressure in the throughbore chamber to the left of the O-ring 208 acts upon the tube 210 and forces it to the right, moving detent 217 to the right of O-ring 208, and preventing further fluid flow. To limit maximum inflation pressure, the pressure in the chamber to the left of O-ring 208 acts upon the tube 210 and poppet 298 causing the spring 268 to deflect from its preload position. This spring deflection permits the tube 210 to move to the right, moves detent 217 to the right of O-ring 208, and prevents further air flow. For this function to occur, the vehicle operator, or the key-lock has column 270 forced to full left position, and spring 266 is inactive. To then limit maximum pressure in this design, the maximum blow-off pressure valve will function independently of the position of the column 270. Pressure to the left of the O-ring 208 in excess of the maximum fill pressure forces the flow tube 210 and poppet 298 to the right with respect to the column 270. The column 270 is prevented from moving to the right by the key-lock, shoulder contact with retainer ring 281 or the operator's hand. The right outer surface of the enlarged shoulder 216 contacts column 270 and prevents further relative movement of the tube 210 with respect to the column 270. When the maximum allowable pressure is approached, the pressure acting through throughbore 214 on the effective area of the poppet 298 is sufficient to overcome the force of spring 268 and force the poppet 298 to break contact with O-ring seal 228, and this permits fluid to escape to atmosphere. The column 270 or 370 bottoms on annular disc 286 or retainer ring 386, respectively, and prevents further motion. The two seals of equal area make this design balanced with respect to reservoir pressure and unlike the FIGURES 2 and 3 embodiments, the controlled pressure functions are not affected by reservoir pressure. In this modification also, pressure indication is a function which extends from minimum pressure to slightly above the maximum inflation pressure.

During automatic operation, when the absorber system pressure exceeds the predetermined maximum operating range, only then will the fluid pressure within tubes 210, 310 be great enough to overcome the resistance of springs 268, 368 and cause separation of tubes 210, 310 from the poppets 290, 390, permitting "blow-off." The seal can be manually broken if the knobs 284, 384 are pulled out sufficiently to cause the enlargements 233, 333 on the poppet guide pins to pull the poppets away from sealing contact with the tubes, but once released, the system will automatically readjust itself as with the first embodiment.

It can thus be seen that a novel selector valve assembly for load supporting shock absorber systems has been provided that permits automatic operation to ensure that the absorber unit pressure is automatically maintained within the designed range and secondly, permits manual operation by the vehicle user as desired.

Although a specific embodiment of the invention has been shown and described to illustrate the principles thereof, it should be realized that many modifications making use of these principles will occur to those skilled in the art. For example, it is contemplated that in some applications it may be desirable to lock the valve system in its midpoint or null position to lock it out of either its filling or blow-off positions. These modifications, which aid the use of the novel system on rough highways, or when the vehicle has the weight removed from its wheels as on a grease rack, are also within the purview of this invention and can be accomplished by means of a key-lock feature as previously described. Accordingly, the scope of this invention should not be limited to the specific embodiments illustrated, but only by the appended claims.

What is claimed is:

1. A selector valve adapted for manual actuation within predetermined operating pressure limits and automatic actuation to maintain pressure within said operating pressure limits comprising: a body portion having an inner end and an outer end; means defining a throughbore in said body between the ends thereof; means defining a first valve port intersecting the throughbore intermediate the throughbore ends; an operating column having inner and outer ends, said operating column being slidably received in the throughbore protruding axially outwardly of the throughbore outer end; a poppet plunger having an outer end positioned within and slidably received by the operating column inner end and an inner end slidably received in the throughbore inner end; an internal valve means mounted in the throughbore inner end adjacent the intersection of the first valve port with the throughbore, said internal valve means having a reciprocable actuator adjacent the poppet plunger inner end; means carried by the poppet plunger defining a seal between the outer peripheral surface of the poppet plunger and the inner peripheral surface of the throughbore at a point intermediate said intersection and the valve body outer end; fluid exhaust means communicating the atmosphere with the throughbore adjacent the valve body outer end; first resilient means carried exterior of said operating column and within said throughbore for urging said operating column and poppet plunger axially toward contact with said internal valve means actuator within said predetermined operating pressure limits, said first resilient means being opposed by fluid pressure acting through said first valve port; and second resilient means carried exterior of said poppet plunger and within said operating column for urging said poppet plunger toward contact with said internal valve means actuator within said operating pressure limits and up to a maximum fluid pressure, said second resilient means being opposed by fluid pressure acting through said first valve port.

2. The selector valve of claim 1 wherein said internal valve means is a tire-type valve.

3. The selector valve of claim 1 including a pressure indicating manual control knob carried by said operating column outer end.

4. The selector valve of claim 1 including means for locking said selector valve.

5. The selector valve of claim 4 wherein said locking means comprises a key attached to said valve body outer end cooperating with a bayonet slot on said operating column outer end.

6. The selector valve of claim 1 including axial slits in said operating column inner end providing flexibility thereof for receiving said poppet plunger outer end.

7. The selector valve of claim 1 including a tapered portion providing for internal enlargement and fluid exhaust from the inner end of said throughbore to the outer end thereof.

8. A selector valve adapted for manual actuation within predetermined operating pressure limits and automatic actuation to maintain pressure within said operating pressure limits comprising: a body portion having an inner end and an outer end; means defining a throughbore in said body between the ends thereof; means defining a first valve port intersecting the throughbore intermediate the throughbore ends; an operating column having inner and outer ends, said operating column being slidably received in the throughbore, the outer end of said operating column protruding axially outwardly of the throughbore outer end; a poppet member having inner and outer ends positioned within and slidably received by the operating column inner end; an internal valve means mounted in the throughbore having inner and outer ends, said outer end being adapted for sealing engagement with the poppet member inner end and being positioned within and slidably received by said operating column inner end; first and second means carried in the throughbore defining a seal between the outer peripheral surface of the internal valve means and the inner peripheral surface of the throughbore, and detent means carried by the internal valve means outer peripheral surface for bypassing said first seal means; fluid exhaust means communicating the atmosphere with the throughbore adjacent the valve body outer end; first resilient means carried exterior of said operating column and within said throughbore for urging said operating column and poppet member axially toward contact with said internal valve means within said predetermined operating pressure limits, said first resilient means being opposed by fluid pressure acting in the throughbore; and second resilient means carried exterior of said poppet member and within said operating column for urging said poppet member toward contact with said internal valve means within said operating pressure limits and up to a predetermined maximum fluid pressure, said second resilient means being opposed by fluid pressure acting in the throughbore.

9. The selector valve of claim 8 wherein said operating column comprises a control knob portion and an operating column portion slidably received therein.

10. The selector valve of claim 9 including a poppet guide pin for operably connecting said poppet member to said control knob portion and said operating column portion.

11. The selector valve of claim 8 wherein the seal between said poppet member and said internal valve means is effectuated by an O-ring seal carried by said internal valve means.

12. The selector valve of claim 8 wherein the seal between said poppet member and said internal valve means is effectuated by a resilient seal carried by said poppet member.

13. The selector valve of claim 8 wherein said internal valve means comprises a flow regulator tube having an enlarged outer end portion providing sealing engagement with said poppet member.

References Cited by the Examiner

UNITED STATES PATENTS

| 2,313,564 | 3/1943 | Manly | 137—116.5 |
| 2,522,913 | 9/1950 | Westman | 317—116.5 |
| 2,783,769 | 3/1957 | Philbrick | 137—116.5 |
| 3,053,335 | 9/1962 | Gnade | 180—22 |
| 3,104,119 | 9/1963 | Long | 280—124 |

BENJAMIN HERSH, *Primary Examiner.*